US010363874B2

(12) United States Patent
Zhang et al.

(10) Patent No.: US 10,363,874 B2
(45) Date of Patent: Jul. 30, 2019

(54) HITCH ASSIST SYSTEM WITH HITCH COUPLER IDENTIFICATION FEATURE AND HITCH COUPLER HEIGHT ESTIMATION (71) Applicant: Ford Global Technologies, LLC, Dearborn, MI (US)

(72) Inventors: Yi Zhang, Sunnyvale, CA (US); Eric Hongtei Tseng, Canton, MI (US); Mohsen Lakehal-ayat, Mountain View, CA (US); Thomas Edward Pilutti, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/708,427

(22) Filed: Sep. 19, 2017

(65) Prior Publication Data

US 2019/0084479 A1   Mar. 21, 2019

(51) Int. Cl.
| *B60R 1/00* | (2006.01) |
| *G06T 7/11* | (2017.01) |
| *G06T 7/13* | (2017.01) |
| *G06T 7/60* | (2017.01) |
| *B60D 1/36* | (2006.01) |
| *B60D 1/06* | (2006.01) |
| *G06F 3/0488* | (2013.01) |

(52) U.S. Cl.
CPC ............... *B60R 1/003* (2013.01); *B60D 1/36* (2013.01); *B60R 1/00* (2013.01); *G06T 7/11* (2017.01); *G06T 7/13* (2017.01); *G06T 7/60* (2013.01); *B60D 1/06* (2013.01); *B60R 2300/20* (2013.01); *B60R 2300/307* (2013.01); *B60R 2300/808* (2013.01); *G06F 3/0488* (2013.01); *G06T 2200/24* (2013.01); *G06T 2207/30252* (2013.01)

(58) Field of Classification Search
None
See application file for complete search history.

(56) References Cited

U.S. PATENT DOCUMENTS

| 7,159,890 B2 * | 1/2007 | Craig ....................... B60D 1/06 280/432 |
| 7,391,303 B2 * | 6/2008 | Ball ......................... B60D 1/36 280/477 |
| 7,840,026 B2 * | 11/2010 | Nishiuchi ................. G06T 7/73 280/735 |

(Continued)

FOREIGN PATENT DOCUMENTS

| DE | 102009011984 A1 * | 9/2010 | ............... B60D 1/06 |
| WO | 2016119920 A1 | 8/2016 | |

OTHER PUBLICATIONS

Machine Translation DE102009011984A1 (Year: 2010).*

*Primary Examiner* — Michelle M Entezari
(74) *Attorney, Agent, or Firm* — Raymond Coppiellie; Price Heneveld LLP (57) ABSTRACT A hitch assist system and method are provided herein. An imager captures one or more images of a trailer having a hitch coupler. A user-input device is provided for specifying a location of the hitch coupler in the one or more captured images. A controller generates an image patch around the user-specified location, segments the image patch to identify the hitch coupler, and estimates a trailer height based on a height and projective geometry of the imager.

18 Claims, 9 Drawing Sheets (56) References Cited

U.S. PATENT DOCUMENTS

| | | | |
|---|---|---|---|
| 9,085,261 B2 | 7/2015 | Lu et al. | |
| 9,446,713 B2 * | 9/2016 | Lu | B60R 1/002 |
| 9,499,018 B2 * | 11/2016 | Gehrke | B60D 1/36 |
| 9,827,818 B2 * | 11/2017 | Hu | B60D 1/30 |
| 10,035,457 B2 * | 7/2018 | Singh | B60D 1/36 |
| 2005/0074143 A1 * | 4/2005 | Kawai | B60D 1/36 |
| | | | 382/104 |
| 2014/0151979 A1 | 6/2014 | Puckett et al. | |
| 2014/0200759 A1 * | 7/2014 | Lu | B60D 1/245 |
| | | | 701/28 |
| 2014/0306425 A1 * | 10/2014 | Atkinson | B60D 1/06 |
| | | | 280/414.5 |
| 2015/0115571 A1 | 4/2015 | Zhang et al. | |
| 2016/0272024 A1 | 9/2016 | Bochenek et al. | |
| 2016/0288711 A1 * | 10/2016 | Gehrke | G06T 7/73 |
| 2016/0378118 A1 * | 12/2016 | Zeng | G05D 1/0246 |
| | | | 701/28 |
| 2018/0061239 A1 * | 3/2018 | Prasad | G08G 1/167 |

\* cited by examiner

HITCH ASSIST SYSTEM WITH HITCH COUPLER IDENTIFICATION FEATURE AND HITCH COUPLER HEIGHT ESTIMATION

FIELD OF THE INVENTION

The present invention generally relates to vehicle backup assist systems, and more particularly, to vehicle backup assist systems that facilitate the hitching of a vehicle to a trailer.

BACKGROUND OF THE INVENTION

Reversing a vehicle toward a trailer in order to attach a tow hitch to a hitch coupler can be challenging for many drivers, particularly those who are unfamiliar with trailers and the hitching process in general. Accordingly, there is a need for a system that assists a driver in navigating a vehicle toward the trailer such that a hitch connection can be made therebetween. The present disclosure is intended to satisfy this need.

SUMMARY OF THE INVENTION

According to a first aspect of the present invention, a hitch assist system is provided. An imager captures one or more images of a trailer having a hitch coupler. A user-input device is provided for specifying a location of the hitch coupler in the one or more captured images. A controller generates an image patch around the user-specified location, segments the image patch to identify the hitch coupler, and estimates a trailer height based on a height and projective geometry of the imager.

Embodiments of the first aspect can include any one or a combination of the following features:

- the user-input device includes a touchscreen display of a vehicle;
- the touchscreen display registers one or more touch events thereon for specifying the location of the hitch coupler;
- the imager is located on a rear of a vehicle and is disposed to capture one or more images of a rear-vehicle scene;
- segmenting the image patch locates a boundary of the hitch coupler;
- the trailer height includes a height of the hitch coupler relative to the ground;
- the hitch coupler includes a coupler ball socket;
- the projective geometry includes angles between a first plurality of field of view components of the imager and the ground and angles between a second plurality of field of view components of the imager and a longitudinal axis of the trailer;
- the controller further determines a horizontal distance between the imager and the hitch coupler based on the estimated trailer height, the height of the imager, a focal length of the imager, a pitch of the imager, and a distance between the imager and a tow hitch of a vehicle; and
- the controller estimates the trailer height by simultaneously solving a system of two equations.

According to a second aspect of the present invention, a hitch assist method is provided and includes the steps of: capturing one or more images of a trailer having a hitch coupler; specifying a location of the hitch coupler in the one or more captured images; generating an image patch around the user-specified location; segmenting the image patch to identify the hitch coupler; and estimating a trailer height based on a height and projective geometry of the imager.

Embodiments of the second aspect can include any one or a combination of the following features:

- the step of specifying is performed using a touchscreen display of a vehicle;
- the touchscreen display registers one or more touch events thereon for specifying the location of the hitch coupler;
- the one or more images includes a rear-vehicle scene;
- the step of segmenting the image patch includes locating a boundary of the hitch coupler;
- the trailer height includes a height of the hitch coupler relative to the ground;
- the hitch coupler includes a coupler ball socket;
- the projective geometry includes angles between a first plurality of field of view components of the imager and the ground and angles between a second plurality of field of view components of the imager and a longitudinal axis of the trailer;
- the step of determining a horizontal distance between the imager and the hitch coupler based on the estimated trailer height, the height of the imager, a focal length of the imager, a pitch of the imager, and a distance between the imager and a tow hitch of a vehicle; and
- the step of estimating a trailer height includes simultaneously solving a system of two equations.

According to a third aspect of the present invention, a hitch assist system is provided. An imager captures one or more images of a trailer having a hitch coupler. A user-input device is provided for specifying a location of the hitch coupler in the one or more captured images. A controller generates an image patch around the user-specified location, segments the image patch to identify the hitch coupler, and estimates a height difference between the imager and the hitch coupler based on projective geometry of the imager.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
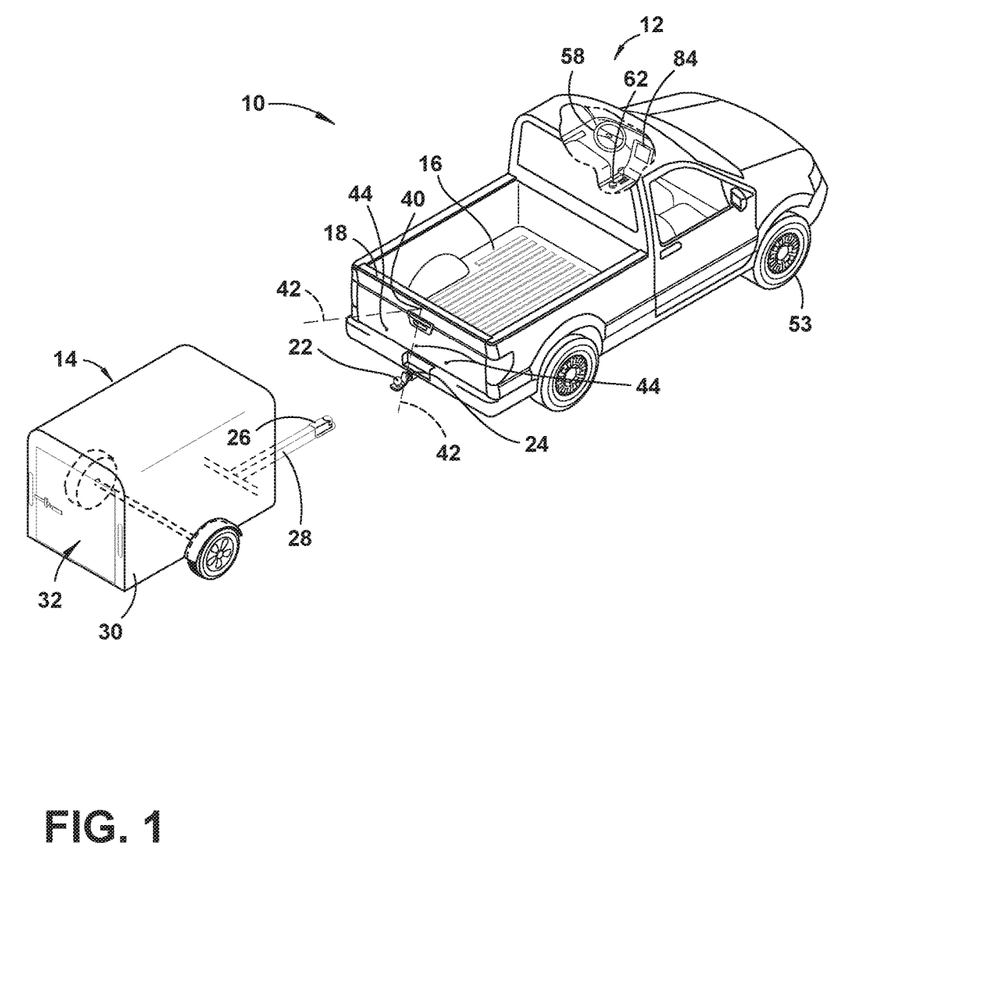
FIG. 1 is a top perspective view of a vehicle and a trailer, the vehicle being equipped with a hitch assist system according to one embodiment.
Figure 2:
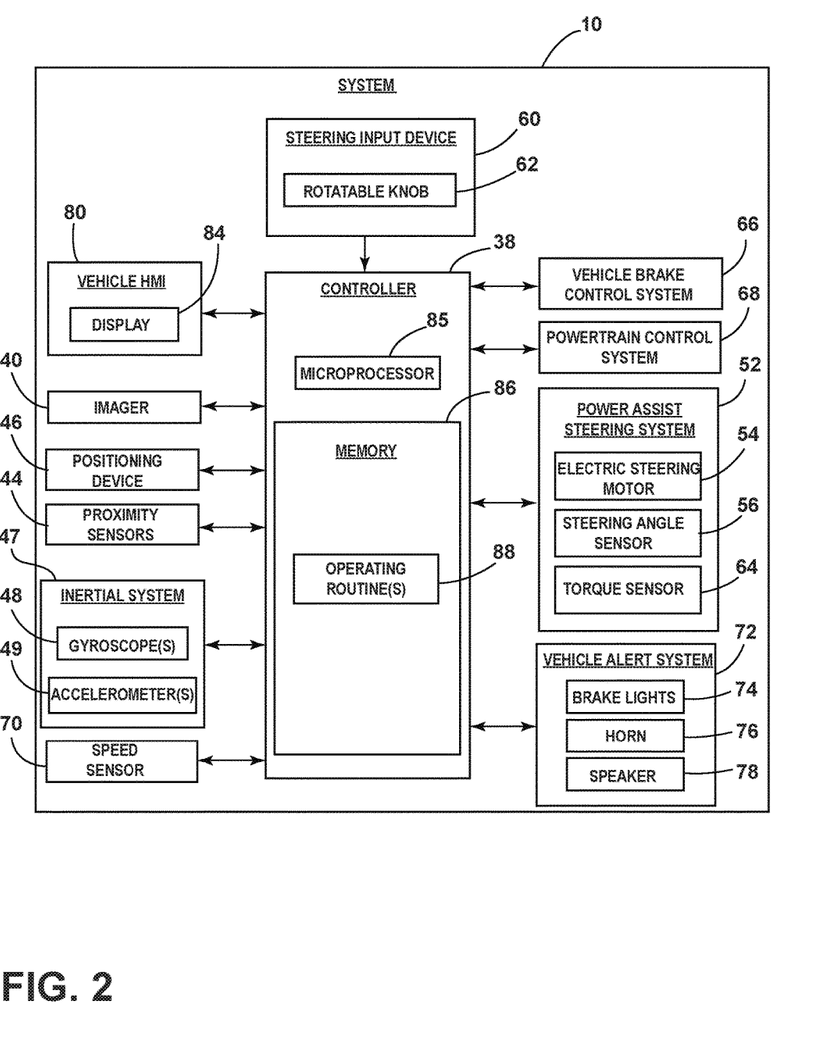
FIG. 2 is a block diagram illustrating certain components of the hitch assist system.

Referring to FIGS. 1 and 2, reference numeral 10 generally designates a hitch assist system for hitching a vehicle 12 to a trailer 14. As shown in FIG. 1, the vehicle 12 is exemplarily embodied as a pickup truck having a truck bed 16 that is accessible via a fold down tailgate 18. The vehicle 12 also includes a tow hitch in the form of a hitch ball 22 extending from a drawbar 24 that is coupled to the rear of the vehicle 12. The hitch ball 22 is configured to be received by a hitch coupler in the form of a coupler ball socket 26 that is provided at a terminal end of a trailer tongue 28. The trailer 14 is exemplarily embodied as a single axle trailer having a box frame 30 with an enclosed cargo area 32 from which the tongue 28 extends longitudinally.

The system 10 includes a controller 38 in communication with an imager 40 located at the rear of the vehicle 12. The imager 40 may be centrally located at an upper region of the tailgate 18 such that the imager 40 is elevated relative to the drawbar 24 and the hitch ball 22. The imager 40 has a field of view 42 located and oriented to capture one or more images of a rear-vehicle scene that generally includes the hitch ball 22, among other things. Images captured by the imager 40 may be processed by the controller 38 to identify a hitch coupler such as the coupler ball socket 26.

In addition to communicating with the imager 40, the controller 38 may communicate with a number of proximity sensors 44 exemplarily shown as ultrasonic or Radar sensors spaced across a lower region of the vehicle tailgate 18 and configured to detect the proximity or distance of objects located rearward of the vehicle 12. With reference to the embodiment of the system 10 shown in FIG. 2, additional vehicle-related information may be provided to the controller 38 by a positioning device 46, such as a global positioning system (GPS) located on the vehicle 12 and/or the trailer 14. Additionally, the controller 38 may communicate with an inertial system 47 including one or more gyroscopes 48 and accelerometers 49 to measure the position, orientation, direction, and/or speed of the vehicle 12.

To enable autonomous or semi-autonomous control of the vehicle 12, the controller 38 of system 10 may be further configured to communicate with a variety of vehicle equipment. According to one embodiment, the controller 38 of the system 10 may control a power assist steering system 52 of the vehicle 12 to operate the steered road wheels 53 of the vehicle 12 while the vehicle 12 is reversed toward the trailer 14 along a vehicle backup path. The power assist steering system 52 may be an electric power-assisted steering (EPAS) system that includes an electric steering motor 54 for turning the steered road wheels 53 to a steering angle based on a steering command generated by the controller 38, whereby the steering angle may be sensed by a steering angle sensor 56 of the power assist steering system 52 and provided to the controller 38. As described herein, the steering command may be provided for autonomously steering the vehicle 12 during a backup maneuver and may alternatively be provided manually via a rotational position (e.g., a steering wheel angle) of a steering wheel 58 or a steering input device 60, which may be provided to enable a driver to control or otherwise modify the desired curvature of the backing path of vehicle 12. The steering input device 60 may be communicatively coupled to the controller 38 in a wired or wireless manner and provides the controller 38 with information defining the desired curvature of the backing path of the vehicle 12. In response, the controller 38 processes the information and generates corresponding steering commands that are supplied to the power assist steering system 52 of the vehicle 12. In one embodiment, the steering input device 60 includes a rotatable knob 62 operable between a number of rotated positions that each provides an incremental change to the desired curvature of the backing path of the vehicle 12.

In some embodiments, the steering wheel 58 of the vehicle 12 may be mechanically coupled with the steered road wheels 53 of the vehicle 12, such that the steering wheel 58 moves in concert with steered road wheels 53 via an internal torque, thereby preventing manual intervention with the steering wheel 58 during autonomous steering of the vehicle 12. In such instances, the power assist steering system 52 may include a torque sensor 64 that senses torque (e.g., gripping and/or turning) on the steering wheel 58 that is not expected from autonomous control of the steering wheel 58 and therefore is indicative of manual intervention by the driver. In some embodiments, external torque applied to the steering wheel 58 may serve as a signal to the controller 38 that the driver has taken manual control and for the system 10 to discontinue autonomous steering functionality.

The controller 38 of the system 10 may also communicate with a vehicle brake control system 66 of the vehicle 12 to receive vehicle speed information such as individual wheel speeds of the vehicle 12. Additionally or alternatively, vehicle speed information may be provided to the controller 38 by a powertrain control system 68 and/or a vehicle speed sensor 70, among other conceivable means. In some embodiments, the controller 38 may provide braking commands to the vehicle brake control system 66, thereby allowing the system 10 to regulate the speed of the vehicle 12 during a backup maneuver of the vehicle 12. It should be appreciated that the controller 38 may additionally or alternatively regulate the speed of the vehicle 12 via interaction with the powertrain control system 68.

Through interaction with the power assist steering system 52, the vehicle brake control system 66, and/or the powertrain control system 68 of the vehicle 12, the potential for unacceptable backup conditions can be reduced when the vehicle 12 is backing toward the trailer 14. Examples of unacceptable backup conditions include, but are not limited to, a vehicle over-speed condition, sensor failure, and the like. In such circumstances, the driver may be unaware of the failure until the unacceptable backup condition is imminent or already happening. Therefore, it is disclosed herein that the controller 38 of the system 10 can generate an alert signal corresponding to a notification of an actual, impending, and/or anticipated unacceptable backup condition, and prior to driver intervention, generate a counter measure to prevent such an unacceptable backup condition.

According to one embodiment, the controller 38 may communicate with one or more devices, including a vehicle alert system 72, which may prompt visual, auditory, and tactile warnings. For instance, vehicle brake lights 74 and vehicle emergency flashers may provide a visual alert and a vehicle horn 76 and/or speaker 78 may provide an audible alert. Additionally, the controller 38 and/or vehicle alert system 72 may communicate with a human machine interface (HMI) 80 of the vehicle 12. The HMI 80 may include a touchscreen display 84 such as a center-stack mounted navigation or entertainment display capable of displaying images indicating the alert. Such an embodiment may be desirable to notify the driver of the vehicle 12 that an unacceptable backup condition is present. In alternative embodiments, the HMI 80 may include a portable device (e.g., a smartphone) capable of communicating with the controller 38 through a wireless interface.

The controller 38 is configured with a microprocessor 85 and/or other analog and/or digital circuitry for processing one or more logic routines stored in a memory 86. The logic routines may include one or more operating routines 88. Information from the imager 40 or other components of the system 10 can be supplied to the controller 38 via a communication network of the vehicle 12, which can include a controller area network (CAN), a local interconnect network (LIN), or other protocols used in the automotive industry. It should be appreciated that the controller 38 may be a stand-alone dedicated controller or may be a shared controller integrated with the imager 40 or other component of the system 10 in addition to any other conceivable onboard or off-board vehicle control systems.

Figure 3:
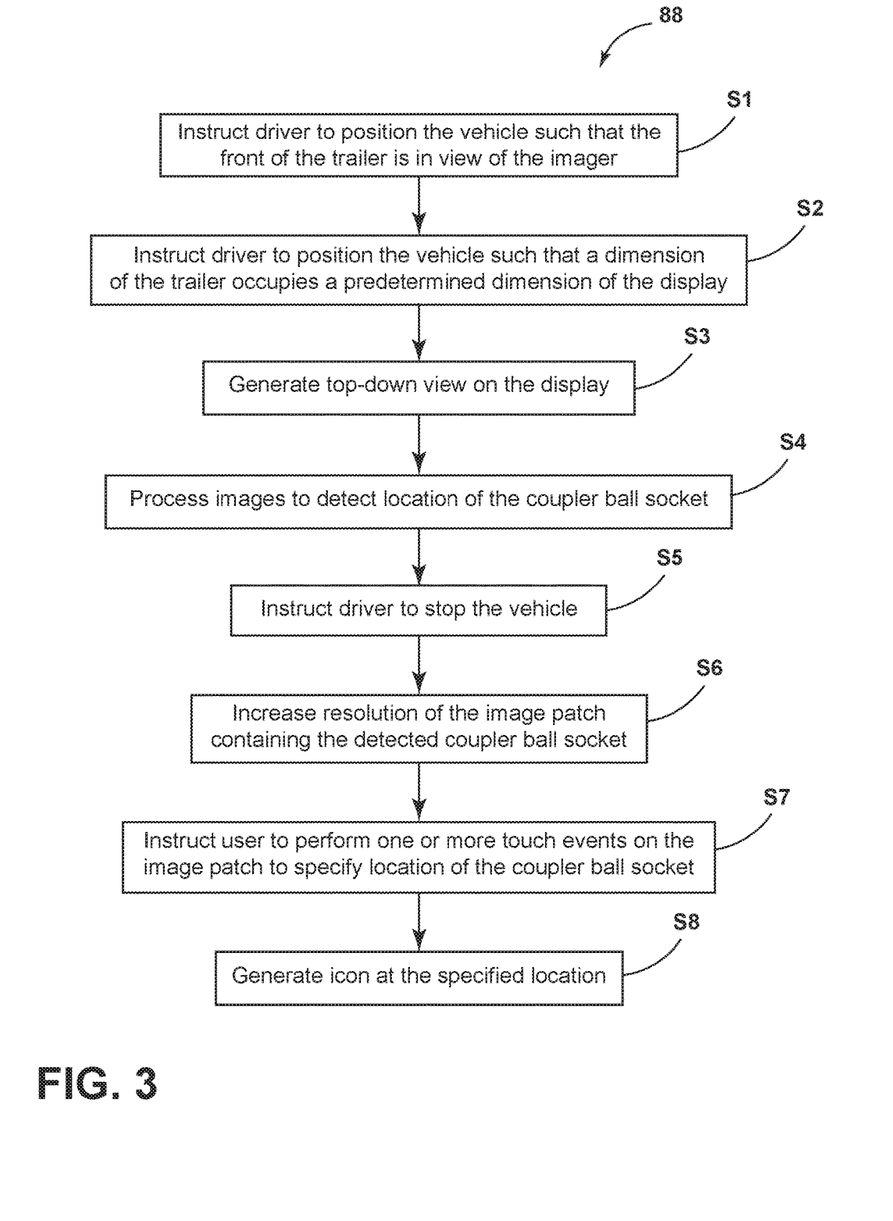
FIG. 3 is a flow chart of a method of identifying a hitch coupler according to one embodiment.
Figure 4:
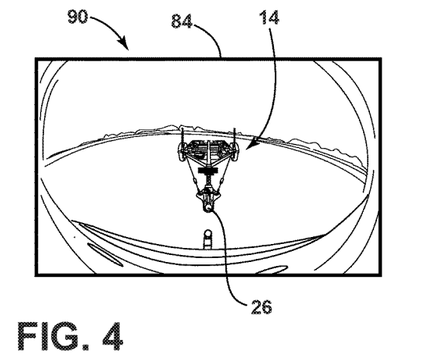
FIG. 4 represents an image captured shown on a display of the vehicle and containing the hitch coupler embodied as a coupler ball socket.

Referring to FIG. 3, a method of identifying a hitch coupler such as the coupler ball socket 26 is shown and is exemplarily embodied as one of the operating routines 88 of the controller 38. At step S1, the controller 38 instructs a driver of the vehicle 12 to position the vehicle 12 such that the front of the trailer 14 is in view of the imager 40. Images captured by the imager 40 may be shown on the display 84 to assist the driver in positioning the vehicle 12 relative to the trailer 14. For example, FIG. 4 shows an image 90 captured by the imager 40. The image 90 is shown on the display 84 and contains the front of the trailer 14 including the hitch coupler, which is shown as coupler ball socket 26.

Figure 5:
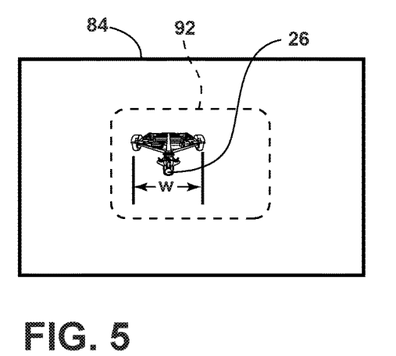
FIG. 5 shows an overlay generated on the display and embodied as a box centered on the display and corresponding to a minimum width of the trailer.
Figure 6:
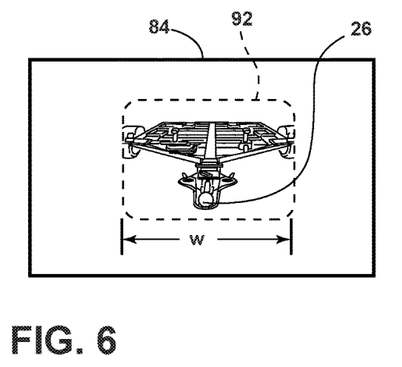
FIG. 6 shows the width of the trailer occupying the overlay.

At step S2, the controller 38 may further instruct a user, typically the driver, to position the vehicle 12 such that a dimension of the trailer 14 occupies a predetermined dimension of the display 84. In one embodiment, as shown in FIG. 5, the predetermined dimension is represented by an overlay 92 generated on the display 84 by the controller 38. The overlay 92 may be embodied as a box centered on the display 84 and corresponds to a minimum width of the trailer 14. The size of the overlay 92 may be determined to facilitate identification of the coupler ball socket 26. As shown in FIG. 5, the width of the trailer 14, shown as width W, is too small, or in other words, fails to occupy the overlay 92. In such a scenario, the controller 38 instructs the driver to further position the vehicle 12 such that the width W of the trailer 14 occupies the overlay 92, as is shown in FIG. 6. For purposes of clarity, the environment surrounding the trailer 14 has been omitted in FIGS. 4 and 5.

Figure 7:
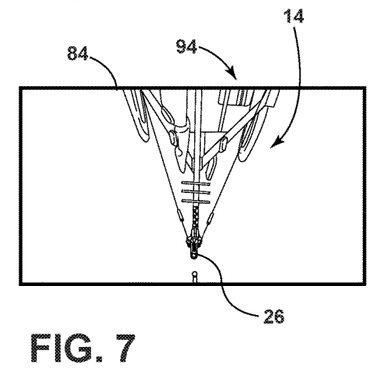
FIG. 7 shows a top-down view generated on the display and containing the coupler ball socket.
Figure 8:
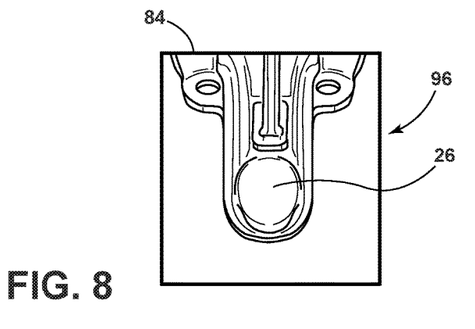
FIG. 8 shows an image patch having increased resolution and containing the coupler ball socket.

Once the width W of the trailer 14 occupies the overlay 92, the controller 38, at step S3, generates a top-down view 94 on the display 84, as shown in FIG. 7. The top-down view 94 generally contains the trailer 14 or portions thereof, namely the coupler ball socket 26. At step S4, the controller 38 processes the captured images to detect a location of the coupler ball socket 26 and/or other trailer structures such as, but not limited to, the tongue 28. To detect the coupler ball socket 26 or other trailer structure, the controller 38 may employ any conventional technique such as pattern recognition or pattern matching. Once the coupler ball socket 26 or other trailer structure is identified, the controller 38 instructs the driver to stop the vehicle 12 at step S5 and increases a resolution in an image patch containing the detected coupler ball socket 26 or other trailer structure at step S6. For example, FIG. 8 shows an image patch 96 with increased resolution and containing the coupler ball socket 26. The image patch 96 may be derived from multiple image frames and is shown on the display 84.

Figure 9:
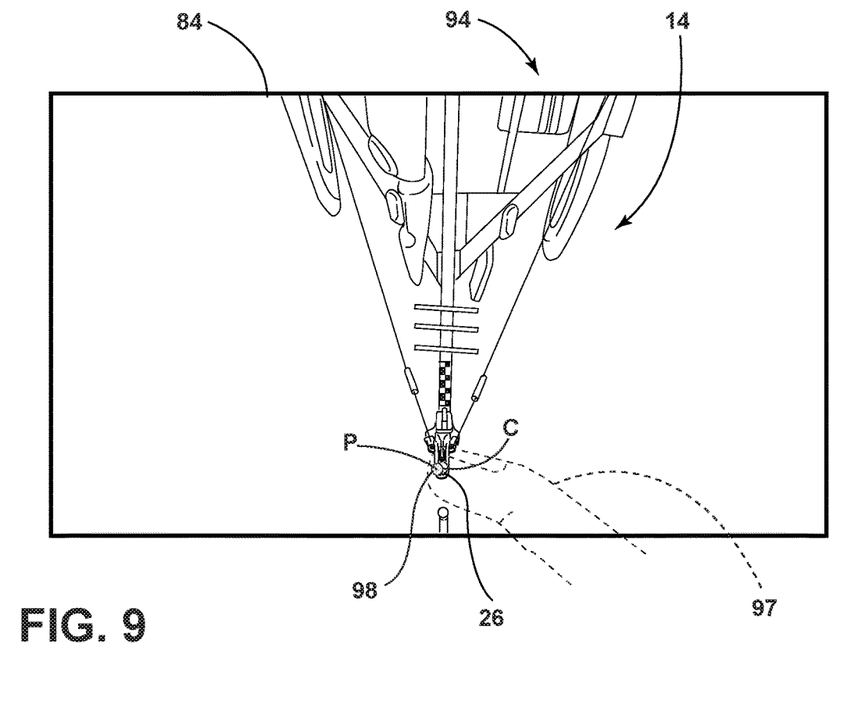
FIG. 9 illustrates a touch event being performed on the display to specify a location of the coupler ball socket and an icon being generated at the specified location.

Next, at step S7, the user is instructed to perform one or more touch events on the image patch 96 to specify a location of the coupler ball socket 26. As exemplarily shown in FIG. 9, the one or more touch events include physically touching the display 84 with a finger 97. In the illustrated example, the finger 97 touches the display 84 at point P, which is slightly offset from a center C of the coupler ball socket 26. The display 84 is configured to register the one or more touch events and the controller 38 is configured to generate an icon 98 at the specified location of the coupler ball socket 26 at step S8.

Figure 10:
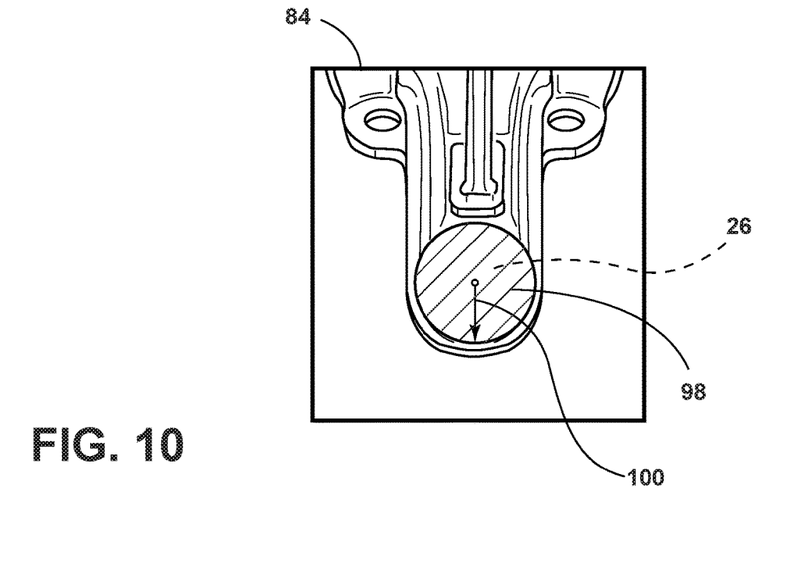
FIG. 10 shows the icon being fitted to the coupler ball socket.

As shown in FIG. 10, the controller 38 may fit the icon 98 to the detected coupler ball socket 26 such that the icon 98 and the detected coupler ball socket 26 coincide with one another and have matching shapes. In the illustrated embodiment of FIGS. 9 and 10, the icon 98 is represented as a circle and the controller 38 fits the icon 98 to the coupler ball socket 26 by concentrically aligning the circle to the coupler ball socket 26 and adjusting a radius of the circle to match a radius of the coupler ball socket 26. For purposes of clarity, a single radius 100 is shown in FIG. 10 and is common to both the icon 98 and the detected coupler ball socket 26. It is contemplated that the icon 98 may be expressed in a variety of colors such as, but not limited to, green.

Figure 11:
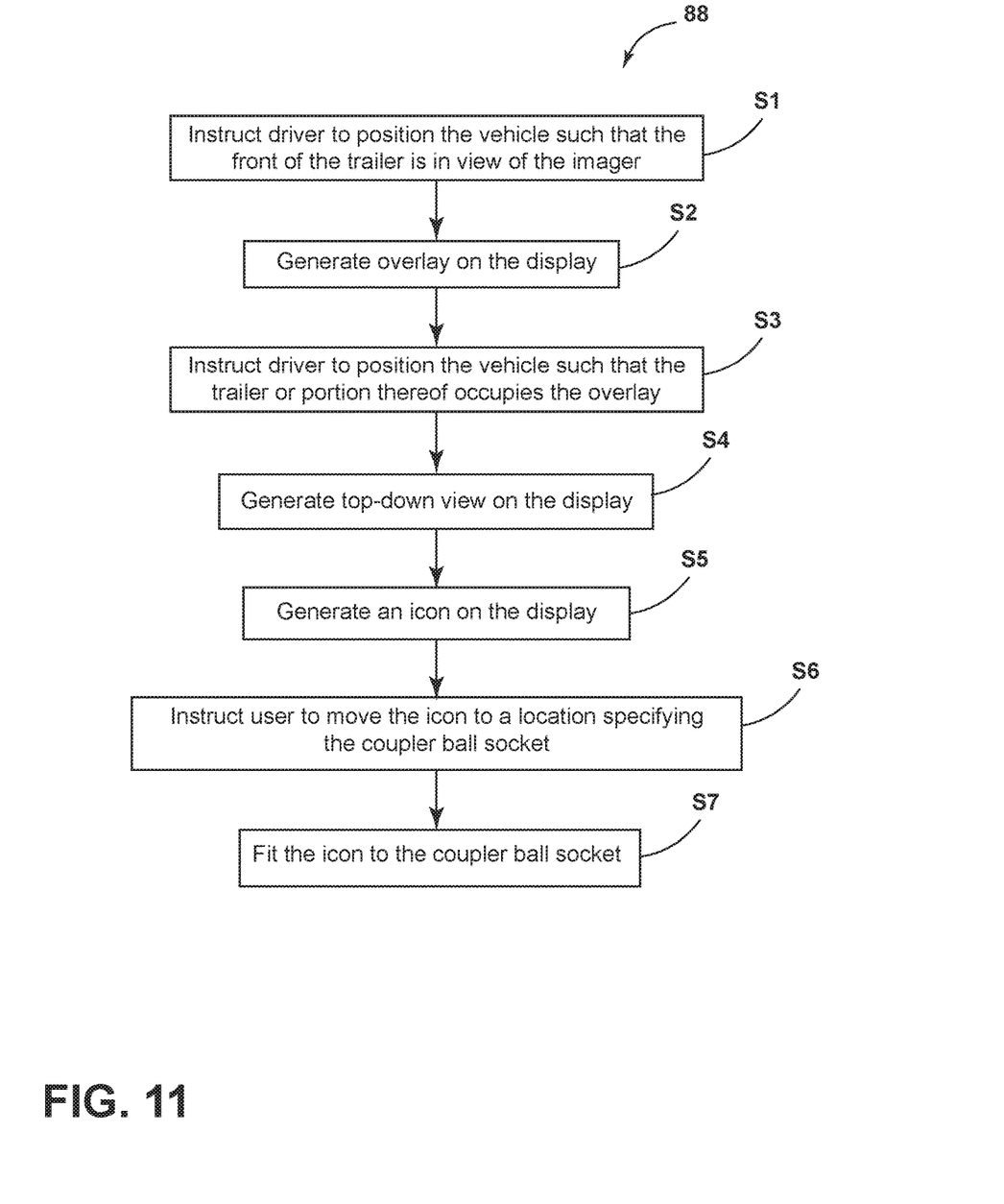
FIG. 11 is a flow chart of a method for identifying a hitch coupler according to another embodiment.

Referring to FIG. 11, another method of identifying a hitch coupler such as the coupler ball socket 26 is shown and is exemplarily embodied as one of the operating routines 88 of the controller 38. At step S1, the controller 38 instructs a driver of the vehicle 12 to position the vehicle 12 such that the front of the trailer 14 is in view of the imager 40. At step S2, the controller 38 generates an overlay on the display 84, and at step S3, instructs the user to position the vehicle 12 such that the trailer 14 or portion thereof occupies the overlay. The overlay may correspond to overlay 92 disclosed previously herein. Alternatively, the overlay may correspond to another minimum dimension of the trailer 14 such as, but not limited to, the tongue 28 of the trailer or other portion thereof.

Figure 12:
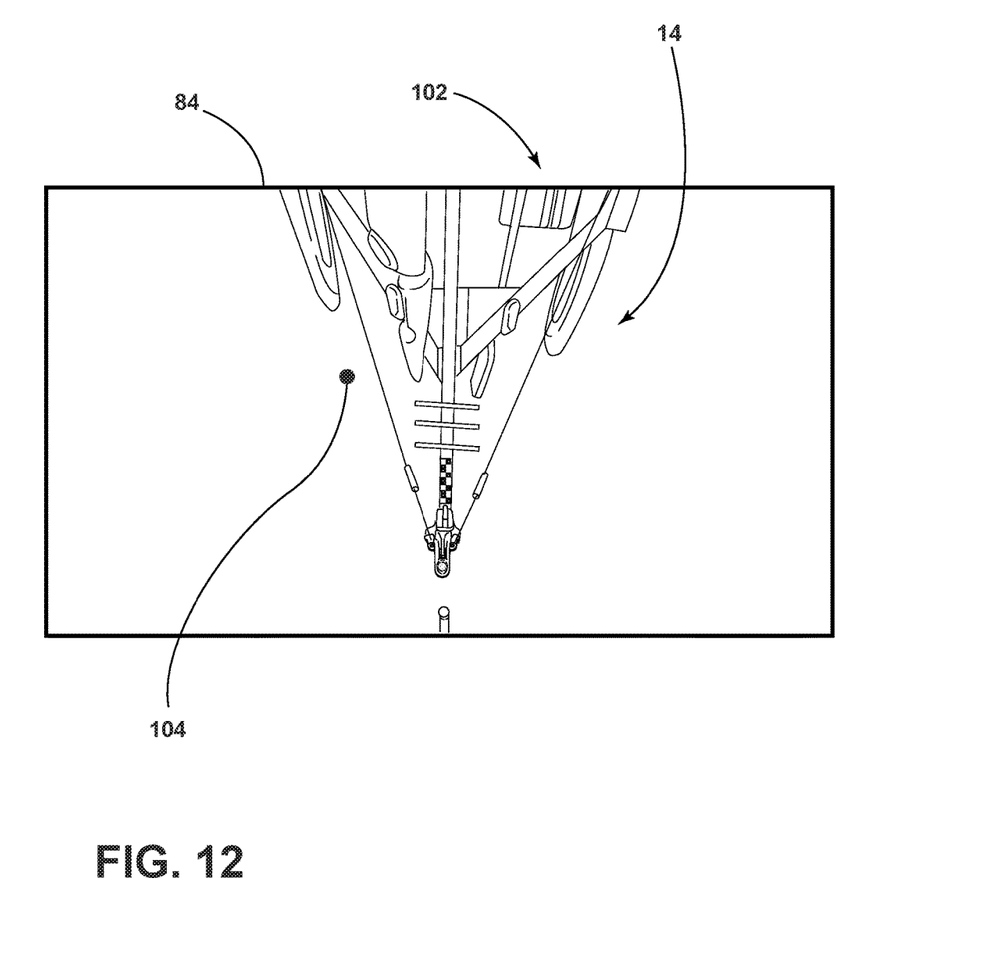
FIG. 12 shows an icon being generated on the display at a predetermined or arbitrary location prior to a touch event being performed.

At step S4, the controller 38 generates a top-down view 102 on the display 84, as shown in FIG. 12. In the top-down view, the controller 38 generates an icon 104 on the display 84 at step S5. The icon 104 is represented as a circle having a first color such as red, for example. The icon 104 may be generated at a predetermined or arbitrary position on the display 84. For purposes of illustration, the icon 104 is generally shown in an off-center position in FIG. 12. While the vehicle 12 is stopped or is moving toward the trailer 14, the controller 38 instructs the user to move the icon 104 to a location specifying the coupler ball socket 26 at step S6. The user may move the icon 104 by performing one or more touch events on the display 84. For example, the user may simply touch the display 84 at the specified location, and in response, the controller 38 moves the icon 104 to the specified location. Alternatively, the user may move the icon 104 by dragging it with his or her finger to the specified location. The icon 104 is subsequently expressed in a second color that is different than the first color once the icon is moved to the specified location of coupler ball socket 26. For example, the icon 104 may be represented as a green circle.

At step S7, the controller 38 fits the icon 104 to the coupler ball socket 26 by concentrically aligning the circle to the coupler ball socket 26 and adjusting a radius of the circle to match a radius of the coupler ball socket 26, as described previously herein. In some embodiments, the one or more touch events and/or subsequent fitting of the circle may be performed on an image patch with increased resolution and containing the coupler ball socket 26.

Figure 13:
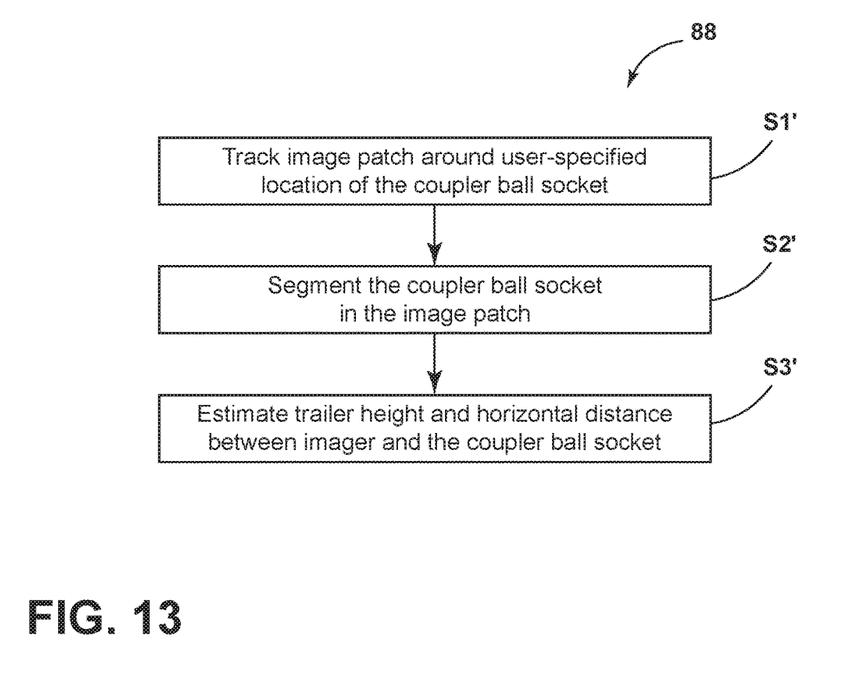
FIG. 13 illustrates subsequent steps performed in continuation of the methods outlined in FIGS. 3 and 11.

In continuation of either method provided above for identifying a hitch coupler and referring to FIG. 13, it is further contemplated that the controller 38 may track an image patch (e.g., image patch 96; FIG. 8) around the user-specified location of the coupler ball socket 26 or other hitch coupler at step S1'. At step S2', the controller 38 segments the coupler ball socket 26 in the image patch. By performing image segmentation on the image patch, it is possible to identify the boundary of the coupler ball socket 26 relative to ground. As such and described in greater detail below, the controller 38 can estimate a trailer height corresponding to the height of the coupler ball socket 26 relative to the ground and a horizontal distance between the imager 40 and the coupler ball socket 26 at step S3'. At the conclusion of steps S1'-S3', the vehicle 12 may be reversed toward the detected hitch coupler of the trailer 14. As contemplated herein, the reversing of the vehicle 12 toward the detected hitch coupler may occur autonomously or semi-autonomously.

Figure 14:
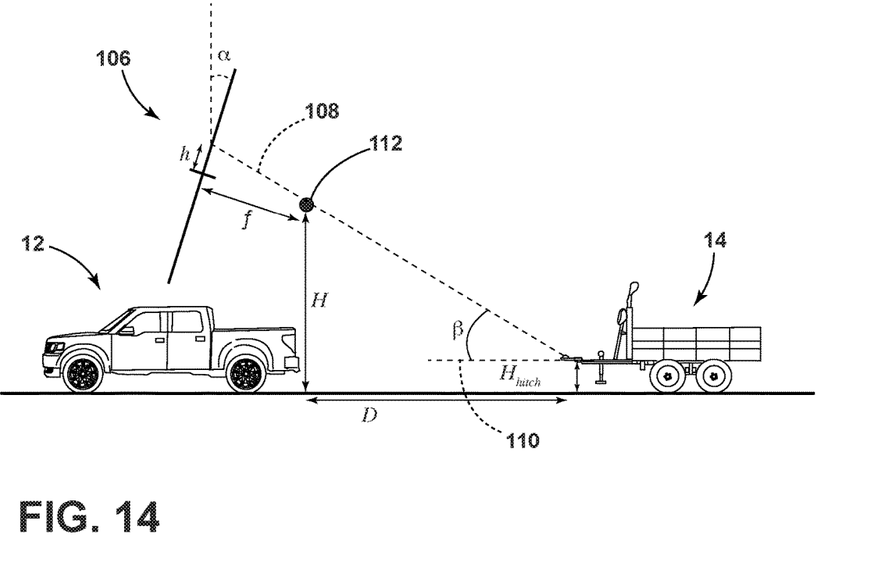
FIG. 14 illustrates a pin-hole camera model associated with an imager of the hitch assist system.

Referring to FIG. 14, a pin-hole camera model 106 is shown generally representing the imager 40 in relation to the trailer 14. As depicted, α denotes the pitch of the imager 40, f denotes the focal length of the imager 40, H denotes the height of the imager 40 relative to the ground, $H_{hitch}$ denotes a trailer height shown to correspond to the height of the hitch coupler (e.g., coupler ball socket 26), and h is the distance between the imager 40 (e.g., the image center) and the tow hitch of the vehicle 12.

From the camera model 106, a horizontal distance D between the imager 40 and the coupler ball socket 26 is provided by the following equation:

$$D = \frac{(H - H_{hitch})}{\tan(\beta)} \quad (1)$$

In equation 1, H is assumed known and β corresponds to the angle between an optical axis 108 of the imager 40 and a longitudinal axis 110 of the trailer 14. As shown, the optical axis 108 of the imager intersects a focal point 112 of the imager and angle β is provided by the following equation:

$$\beta = \alpha + \tan^{-1}\left(\frac{h}{f}\right) \quad (2)$$

In equation 2, α, h, and f are assumed known. Before equation 1 can be solved for the horizontal distance D, the trailer height $H_{hitch}$ is determined by simultaneously solving a system of two equations:

$$\bar{s}T = \frac{H - H_{hitch}}{\tan\gamma_2} - \frac{H - H_{hitch}}{\tan\gamma_1} \quad (3)$$

$$\bar{s}T = \frac{H}{\tan\theta_2} - \frac{H}{\tan\theta_1} \quad (4)$$

Figure 15:
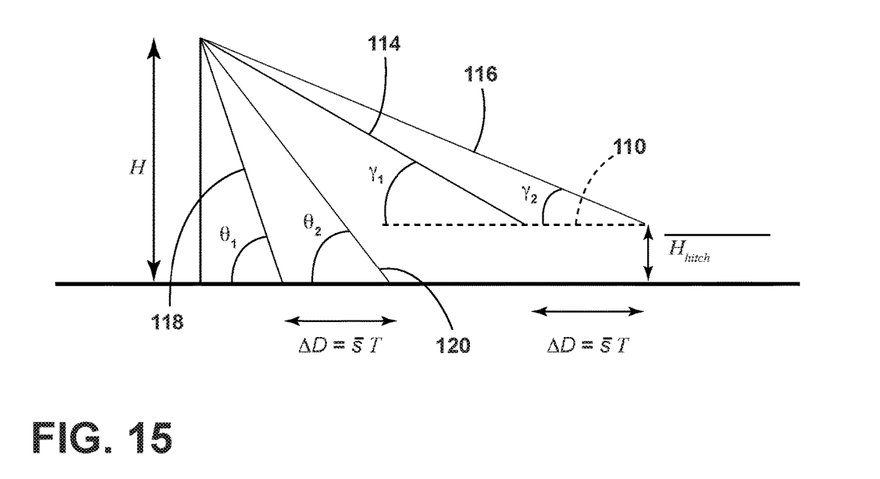
FIG. 15 illustrates variables for estimating a trailer height and their geometric relationship with respect to the vehicle and the trailer.

In equations 3 and 4, $\bar{s}$ is an unknown scalar quantity, T is a scaled translation estimated from visual odometry or wheel count, for example, and angles $\gamma_1$, $\gamma_2$, $\theta_1$, and $\theta_2$ are derived from projective geometry of the imager 40 based on the pin-hole camera model 106 shown in FIG. 14. Accordingly, $\bar{s}$ and $H_{hitch}$ can be determined by solving equations 3 and 4. Once $H_{hitch}$ is known, equation 1 can be solved to determine the horizontal distance D. For purposes of illustration, the variables associated with equations 3 and 4 are depicted in FIG. 15. As shown, angles $\gamma_1$ and $\gamma_2$ correspond to the angles between field of view components 114 and 116 and the longitudinal axis 110 of the trailer 14 whereas angles $\theta_1$, and $\theta_2$ correspond to the angles between field of view components 118 and 120 and the ground. It will be understood that field of view components 114-120 originate from the imager 40 and are selected based on projective geometry of the imager 40. Assuming the trailer height $H_{hitch}$ is higher than the height of the tow hitch (e.g., hitch ball 22), the vehicle 12 can be successfully backed toward the trailer 14 such that the hitch ball 22 is vertically aligned with the coupler ball socket 26 of the trailer 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A hitch assist system comprising:
    an imager for capturing one or more images of a trailer having a hitch coupler;
    a user-input device for specifying a location of the hitch coupler in the one or more captured images; and
    a controller for:
        generating an image patch around the user-specified location;
        segmenting the image patch to identify the hitch coupler; and
        estimating a trailer height based on both a height and projective geometry of the imager, wherein the projective geometry comprises at least two angles between a first plurality of field of view components and the ground and at least two angles between a second plurality of field of view components and a longitudinal axis of the trailer, and wherein the first and second plurality of field of view components originate from the imager and are selected based on a projective geometry of the imager.

2. The hitch assist system of claim 1, wherein the user-input device comprises a touchscreen display of a vehicle.

3. The hitch assist system of claim 2, wherein the touchscreen display registers one or more touch events thereon for specifying the location of the hitch coupler.

4. The hitch assist system of claim 1, wherein the imager is located on a rear of a vehicle and is disposed to capture one or more images of a rear-vehicle scene.

5. The hitch assist system of claim 1, wherein segmenting the image patch locates a boundary of the hitch coupler.

6. The hitch assist system of claim 1, wherein the trailer height comprises a height of the hitch coupler relative to the ground.

7. The hitch assist system of claim 1, wherein the hitch coupler comprises a coupler ball socket.

8. The hitch assist system of claim 1, wherein the controller further determines a horizontal distance between the imager and the hitch coupler based on the estimated trailer height, the height of the imager, a focal length of the imager, a pitch of the imager, and a distance between the imager and a tow hitch of a vehicle.

9. The hitch assist system of claim 1, wherein the controller estimates the trailer height by simultaneously solving a system of two equations.

10. A hitch assist method comprising the steps of:
capturing one or more images of a trailer having a hitch coupler;
specifying a location of the hitch coupler in the one or more captured images;
generating an image patch around the user-specified location;
segmenting the image patch to identify the hitch coupler; and
estimating a trailer height based on both a height and projective geometry of the imager, wherein the projective geometry comprises at least two angles between a first plurality of field of view components and the ground and at least two angles between a second plurality of field of view components and a longitudinal axis of the trailer, and wherein the first and second plurality of field of view components originate from the imager and are selected based on a projective geometry of the imager.

11. The hitch assist method of claim 10, wherein the step of specifying is performed using a touchscreen display of a vehicle.

12. The hitch assist method of claim 11, wherein the touchscreen display registers one or more touch events thereon for specifying the location of the hitch coupler.

13. The hitch assist method of claim 10, wherein the one or more images comprise a rear-vehicle scene.

14. The hitch assist method of claim 10, wherein the step of segmenting the image patch comprises locating a boundary of the hitch coupler.

15. The hitch assist method of claim 10, wherein the trailer height comprises a height of the hitch coupler relative to the ground, and wherein the hitch coupler comprises a coupler ball socket.

16. The hitch assist method of claim 10, further comprising the step of determining a horizontal distance between the imager and the hitch coupler based on the estimated trailer height, the height of the imager, a focal length of the imager, a pitch of the imager, and a distance between the imager and a tow hitch of a vehicle.

17. The hitch assist method of claim 10, wherein the step of estimating a trailer height comprises simultaneously solving a system of two equations.

18. A hitch assist system comprising:
an imager for capturing one or more images of a trailer having a hitch coupler;
a user-input device for specifying a location of the hitch coupler in the one or more captured images; and
a controller for:
generating an image patch around the user-specified location;
segmenting the image patch to identify the hitch coupler; and
estimating a height difference between the imager and the hitch coupler based on both a height and projective geometry of the imager, wherein the projective geometry comprises at least two angles between a first plurality of field of view components and the ground and at least two angles between a second plurality of field of view components and a longitudinal axis of the trailer, and wherein the first and second plurality of field of view components originate from the imager and are selected based on a projective geometry of the imager.

* * * * *